US012391221B2

(12) United States Patent
Mayer et al.

(10) Patent No.: US 12,391,221 B2
(45) Date of Patent: Aug. 19, 2025

(54) WASH CONFIGURATOR

(71) Applicant: Washtec Holding GmbH, Augsburg (DE)

(72) Inventors: Stefan Mayer, Neusaess (DE); Andreas Sattler, Munich (DE); Bernhard Heinz, Gersthofen (DE)

(73) Assignee: Washtec Holding GmbH, Augsburg (DE)

( * ) Notice: Subject to any disclaimer, the term of this patent is extended or adjusted under 35 U.S.C. 154(b) by 0 days.

(21) Appl. No.: 16/884,018

(22) Filed: May 26, 2020

(65) Prior Publication Data

US 2020/0282960 A1 Sep. 10, 2020

Related U.S. Application Data

(63) Continuation of application No. PCT/EP2018/082513, filed on Nov. 26, 2018.

(30) Foreign Application Priority Data

Nov. 27, 2017 (DE) .................... 10 2017 127 979.2

(51) Int. Cl.
*B60S 3/04* (2006.01)
*G05B 19/042* (2006.01)
(52) U.S. Cl.
CPC ............ *B60S 3/04* (2013.01); *G05B 19/0426* (2013.01); *G05B 2219/23328* (2013.01)
(58) Field of Classification Search
CPC ........................................................ B60S 3/04
See application file for complete search history.

(56) References Cited

U.S. PATENT DOCUMENTS 4,893,229 A 1/1990 Detrick
6,277,207 B1 * 8/2001 Gauthier ................. B60S 3/042
134/123

(Continued)

FOREIGN PATENT DOCUMENTS

CN 102326128 B 4/2016
CN 105955188 A 9/2016

(Continued)

OTHER PUBLICATIONS

Office Action issued in German Patent Application No. DE 10 2017 127 979.2, dated Jan. 8, 2018 (from which this application claims priority) and English language translation thereof.

(Continued)

*Primary Examiner* — Marc Lorenzi
(74) *Attorney, Agent, or Firm* — Ewers IP Law PLLC; Falk Ewers

(57) ABSTRACT

An automatic generation of washing programs for an automatic vehicle washing installation is provided. For this purpose, a washing program generator with a washing program generation unit is provided. This includes an input interface for reading-in an equipment data set which represents how the washing installation is currently equipped with machine components, a processor unit for computation of a group of function blocks based on the equipment data set read-in via the input interface, a user interface which is intended for outputting the group of function blocks computed by the processor unit and is intended for detection of a selection of the output function blocks, wherein the processor unit is further intended to compute a washing program based on the detected selected function blocks for operation of the washing installation.

4 Claims, 5 Drawing Sheets

(56) References Cited

U.S. PATENT DOCUMENTS

| | | |
|---|---|---|
| 6,718,216 B2 | 4/2004 | Grier |
| 10,139,812 B2 | 11/2018 | Jones et al. |
| 2003/0233153 A1 | 12/2003 | Grier |
| 2011/0126857 A1 | 6/2011 | Kaipainen |
| 2018/0345918 A1 | 12/2018 | Foerg et al. |

FOREIGN PATENT DOCUMENTS

| | | |
|---|---|---|
| DE | 102016101481 A1 | 8/2017 |
| DE | 102016101482 A1 | 8/2017 |
| JP | 08169310 A | 7/1996 |
| WO | 02099579 A2 | 12/2002 |

OTHER PUBLICATIONS

International Search Report and Written Opinion dated Feb. 11, 2019 of international application PCT/EP2018/082513 on which this application is based.

Office Action issued in Chinese Counterpart Patent Application No. CN 201880076174.2 dated Dec. 2, 2020 and English language machine translation thereof.

Opposition Paper filed in European Counterpart Patent Application No. EP3717314 dated May 11, 2022 and English language machine translation thereof.

\* cited by examiner

WASH CONFIGURATOR

CROSS REFERENCE TO RELATED APPLICATIONS

This application is a continuation application of international patent application PCT/EP2018/082513, filed Nov. 26, 2018, designating the United States and claiming priority to German application 10 2017 127 979.2, filed Nov. 27, 2017, and the entire content of both applications is incorporated herein by reference.

TECHNICAL FIELD

The present disclosure relates to the field of automatic washing installations for vehicles and in particular to generating washing programs for operating the washing installation.

BACKGROUND

The related art includes the pre-configuring of a group of standard washing programs and then delivering the washing installation to an operator with the pre-configured standard washing programs. The operator can select a specific program from the group of standard washing programs before commissioning of the installation.

The washing installations include a large number of electrically controllable machine components such as pumps, valves, drives, etc., which can be installed in different configurations in the washing installation. Furthermore, each operator has specific requirements (e.g. local water supply pressure, typical level of dirt on the vehicles, etc.).

In order to meet these requirements, provision is made in known installations for the operator to be able to select a suitable program for the operator from a group of about 250 different standard washing programs. In so doing, the operator may carry out adaptations to the current circumstances with corresponding parametrisations.

However, the problem therein is that the operator is limited to the selection of the standard washing programs. This proves to be disadvantageous.

A further problem is that the installations require rigorous maintenance. After delivery and commissioning of an installation, adaptations for the operation of the installation have thus far been possible only in a highly labour-intensive manner and at the machine component level by a service technician.

After delivery of the installation it has thus far not been possible to change the scope of performance of the installation by quick and simple measures.

SUMMARY

In view of the foregoing, it is an object of the present disclosure to improve the operation of automatic vehicle washing installations and in particular to reduce operating costs. Furthermore, the operation of the washing installation should be more flexibly adaptable to the respective requirement after delivery or shipping. In addition, the generation of the executable washing programs should be adapted to a currently detected installation configuration.

This object is achieved by a method for generating a washing program for operation of an automatic washing installation for vehicles, a washing program generating unit for generating washing programs for an automatic washing installation for vehicles, and a computer program as described herein.

The present disclosure relates to a method for generation of a washing program for operation of an automatic vehicle washing installation. It should be possible to generate washing programs locally on the delivered washing installation, which programs can also be executed with the washing installation as currently equipped and configured. In so doing, it should also be possible for the operator to specify the scope of performance of the washing program.

According to a first aspect of the disclosure, the method includes the following steps:

- reading-in an equipment data set which represents how the washing installation is currently equipped with machine components,
- specifying activatable function blocks on the basis of the read-in equipment data set and providing or outputting same in particular at a user interface for selection by the user,
- detecting a selection by the user (operator) of the provided activatable function blocks, and
- automatically generating the washing program with a computed sequence of selected activatable function blocks for operation of the washing installation.

A definition of the terms used in this application is given hereinunder.

The equipment data set is a digital data set which represents provision of machine components of the washing installation. The equipment data set can designate, e.g., the installation of software and/or hardware or the currently existing fitting out of the machine from a plurality of fitting-out variations. Thus, depending on the machine, different operating assemblies, such as pumps, valves, drive assemblies, etc. can be installed. The existing fitting out or the machine components used are represented in the equipment data set. The equipment data set therefore includes in particular a data set element which represent the "installed" situation of machine components or operating assemblies in the washing installation. This also includes the information as to the position in the washing installation at which each component is installed and the version and configuration thereof. This information can be stored and represented in a position element of the equipment data set. The equipment data set can typically include a changeable or dynamic operating constellation data set and an unchangeable and fixed portion, namely the configuration data set. Both portions relate exclusively to the machine components built-in or installed in the washing installation. The fixed portion (configuration data set) relates to the (delivered) provision and configuration of machine components of the washing installation (usage situation). It usually remains fixed after delivery of the installation. The variable changeable portion (operating constellation data set) relates to changes of operating conditions for the machine components of the washing installation, e.g., changed water pressure. It can also relate to changes on the machine components (e.g., in the case of a fault or when a machine component fails). The variable portion of the equipment data set is typically continuously read-in or detected in updated form. This typically takes place in a time phase after delivery of the installation and during operation.

The equipment data set is usually delivered directly with the installation and stored in, and available from, a local memory or a memory card on the installation. Alternatively, it can also be retrieved via an interface (e.g., an http-based interface). The equipment data set is therefore typically read-in from an internal local memory of the washing installation.

The equipment data set can typically also include a configuration or a parametrisation of the machine components, e.g., a length and/or diameter of a hose, the maximum pump output of a metering pump, the size of storage vessels and/or maximum or minimum travel speeds of drives, etc. Therefore, the generation of the washing program can be carried out in a more specific and dedicated manner for the respective configuration of the machine components.

In a further exemplary embodiment of this disclosure, the equipment data set includes a position element. This designates a position of the machine component in the washing installation. Therefore, a plurality of washing installation machine components of the same type can also be addressed in a dedicated manner. Thus, for example, a plurality of similar brushes can be disposed at different positions of the washing installation. In this exemplary embodiment of the disclosure, the washing program to be generated can advantageously be geared to the respective positioning of the brush and control the activation thereof in terms of time.

A single machine component or a group of machine components are formed to execute a specified function block of the washing program. The washing program can include a sequence of steps. Different function blocks may be required for this purpose. Thus, e.g., a group of machine components, such as a water pump, a metering pump, water valves, brush rotation drives and possibly further lifting and travel drives may be necessary to execute the function block (or module) "brush wash". In order to execute a step of the washing program, a single machine component or a group of machine components is therefore necessary. In a further exemplary embodiment of the disclosure, the washing program includes a sequence of steps which are executed on the same and/or different machine components.

The machine components are, e.g., operating assemblies of the washing installation or structural units thereof. The machine components are typically electronically controllable and for this purpose have electronic interfaces for data exchange.

The function blocks are superordinate functions which the washing installation is to execute. A function block is a modular component of the washing program. The function block is therefore a module or a step in the washing program. Thus, e.g., a function block "wheel rim cleaning", "brush wash", "pre-cleaning" and/or "intensive drying" can be provided. New function blocks can be defined at any time. In accordance with the disclosure, on the basis of currently detected variables, it is specified which function blocks are to be connected to form a washing program adapted to the local and current circumstances. The function blocks describe the functions to be carried out or actions of the washing installation not on a component level (i.e., not on the basis of the machine component level, e.g., "valve 1 open", "close switch 2", "metering pump on") but on a superordinate functional level and characterise the functions from the point of view of the operator or user. A function block therefore relates to a washing program section.

However, a function block has specific requirements at the component level. Thus, e.g., a brush wash requires the "brush" machine component. Which technical requirements, in particular at the component level, are associated with a specified function block are stored and fixedly encoded in the respective function block. A function block further includes information relating to permitted connectability with (or to) other function blocks in the process sequence.

Thus—presented schematically—for the block 1 it may be defined that, prior to its execution, block a and b and then block d must be executed. For example, it may be defined that prior to "drying" a "wash" must always have taken place—or prior to the "intensive cleaning" step it is necessary for a cleaning agent to have been applied. Furthermore, specified other function blocks can be stored in a white list which may be connected to the respective function block, and function blocks which cannot permissibly be connected to form a washing program can be stored in a black list. A white list and a black list can be allocated to each function block. A function block is clearly identifiable with its identification number. In an exemplary embodiment of the disclosure, the connection information and therefore the permitted options for combining function blocks to form a washing program are stored directly in the function block as a connection data object. In one variation, it is also possible to store the connection information indirectly, specifically, e.g., in a central database. For this purpose, the identification number of the function block is used and the functionality data object and/or the component data object and/or the connection data object are stored in the database.

In an exemplary embodiment of the disclosure, a function block stores at least three data sets or parameters, namely relating to the:
1. Speed. This includes all speed adaptations—or changes, e.g., the gantry speed, the lifting speed, the advancing speed of individual assemblies. The speeds can differ depending on the selected quality level.
2. Chemical concentration (e.g. parameter range of pre-cleaning agent 1-15%), and
3. Sequence variation (the same functionality, e.g., wheel wash, can be achieved with different sequence variations, e.g., wheel wash brush rotation with single change of rotational direction or multiple changes of rotational direction with simultaneous extension of the working time).

After delivery of the washing installation, each function block can be changed or manipulated to a different degree by the operator.

In a first variation, a change can only be carried out in a uniform manner for all function blocks and all washing programs of a washing installation. All washing programs and all function blocks contained therein are optimized in a uniform manner, e.g., to achieve a short process time.

In a second variation, a change to the function blocks may be different for an installation but may only be carried out in a uniform manner for a washing program. For example, washing program 1, and all function block contained therein, is optimized to a short process time, while washing program 2 and all function blocks contained therein are optimized to maximum cleaning and drying.

In a third variation, a change to all function blocks can also be changed for each washing program of the installation individually and even for each function block individually. Thus, e.g., the following can be adjusted: washing program with maximum cleaning in the pre-wash but time-optimized brush wash and maximum drying result. Furthermore, e.g., the pre-cleaning agent concentration can be individually adjusted in the functional module for each program. A first function block can therefore even be adjusted or changed differently and individually like a second function block in the same washing program.

In addition, a washing program is divided into four phases: pre-wash, brush wash, waxing/care, and drying.

A function block can be allocated to one of these four phases or categories. If a plurality of function blocks is activatable within this category/phase, a priority is configured for the function block, which is likewise stored as a data set in the function block. If, e.g., a plurality of function blocks from the same wash phase are used in a washing program, the priority controls which function block is processed first and which thereafter. Thus, e.g., control is possible such that cleaning of insect residue is to be carried out with higher priority and therefore before an application of foam.

A function block therefore relates to a washing program section, e.g., "wheel wash". A function block can be operated in different sequence variations. In so doing, the sequence variations may require different machine components or operating assemblies. In the wheel wash example, e.g., in a first sequence variation, the wheel washing brush is moved from/to the wheel, which requires operation of an advancing motor. In a second sequence variation, the wheel wash can be carried out only at high pressure. In this case, the high-pressure nozzle is activated and a movement of the wheel washing brush or motor operation is not required. If, in the detected state of the machine, e.g., the advancing motor has been identified as not present or as faulty, the "wheel wash" function block can nevertheless be offered in the second sequence variation and executed in an error-free manner.

Therefore, a function block has specific requirements at the component level. Thus, e.g., a brush wash requires the "brush" machine component. Which technical requirements, in particular at the component level, are associated with a specified function block are stored and fixedly encoded in the respective function block. A function block therefore includes information relating to permitted connectability in the process sequence with other function blocks. Thus—presented schematically—for a block 1 it may be defined that, prior to its execution, block a and b and then block d must be executed. For example, it may be defined that before "drying" a "wash" must always have taken place. Or, before the "intensive cleaning" step it is necessary to have applied a cleaning agent. Furthermore, specified other function blocks can be stored in a white list which may be connected to the respective function block. Correspondingly, a black list can store specified other function blocks which cannot permissibly be connected to form a washing program and therefore must not be combined. In an exemplary embodiment of the disclosure, the connection information and therefore the permitted options for combining function blocks to form a washing program are stored directly in the function block.

The specifying of activatable function blocks is carried out in response to the read-in equipment data set. The specifying is carried out automatically by a functionality algorithm. The operator is offered a group of function blocks. These are available for selection either directly on the installation or they can be read-in via an interface from a server or a database. In order to generate washing programs at the respective installation, from this group of function blocks, only those which are also activatable in the respective installation are offered for selection by the operator. This is generally only a selection from the group of function blocks. Fundamentally, only those function blocks for which the necessary machine components are formed in the installation are activatable. Thus, e.g., the "wheel rim cleaning" function block can be activated only when both "wheel rim brushes" machine components are installed in the installation on both vehicle sides. This has the advantage that the operator can select only those function blocks which he can also execute on site at his installation with the existing provision. The other function blocks are not even offered to the operator. From the group of activatable function blocks, the operator then selects a specified one. From the operator's input (the operator's selection) and the information in the selected function blocks in relation to connectability thereof, a program sequence is then computed and generated automatically to form a washing program. This has the advantage that at any moment, new function block can be defined and provided and connected to form a washing program without the machine controller having to be changed.

In dependence upon the currently detected circumstances and requirements, which are represented in the equipment data set, the activatable function blocks which can be executed in the specific case are specified and output—e.g., on a (graphic) user interface—for selection by the user. Thereupon, the user, in particular the operator or service technician, has the option of selected specified function blocks which he would like to offer on the machine for use by his customers. It proves to be advantageous that the user does not have to have specific knowledge of the technical design of the washing installation. He is automatically offered for selection only those function blocks which can be executed in the detected operating conditions (represented in the equipment data set) and therefore generally only one selection. Alternatively, the selection can be detected not by a user input but on the basis of pre-settings/factory settings or can be read-in via an interface by separate electronic modules. One advantage of the disclosure can also be seen in the fact that the user does not have to observe any chronological order when selecting his function blocks. The chronological connection to form a washing program results automatically from the connection rules and is computed automatically in accordance with the disclosure. Thus, the user can select, e.g., a function block C, then A, and then B. However, the generated washing program has the sequence A, B and C by virtue of the stored connection rules.

All steps of the above-described method are typically executed automatically, in particular the specifying of activatable function blocks and the generation of a washing program take place automatically. Therefore, the efficiency of the commissioning of the installation can be increased and sources of errors owing to incorrect or non-optimal manual configurations can be avoided.

In one advantageous embodiment of the disclosure, the generation of the washing program is carried out in particular before or during the commissioning of the washing installation. This has the advantage that the washing installation can be operated with less susceptibility to faults, in that operation thereof can be adapted to the current operating conditions and to the fitting out of the washing installation. Alternatively, the generated washing program can also be adapted and/or optimized during operation on the basis of dynamically detected operating combinations. Therefore, the maintenance costs can be reduced.

In another exemplary embodiment of the disclosure, the equipment data set includes equipping the installation for selection of activatable function blocks. The equipment data set can also relate to the external operating conditions of the washing installation, e.g., the water supply pressure, the quality of washing agents, the ambient temperature, etc. These variables are considered in order to generate the washing program. This has the advantage that the generation of the washing programs can be adjusted adaptively to the current circumstances and operating conditions. This consequently leads to clear cost savings.

In a further exemplary embodiment of the disclosure, the washing installation is operated with the generated washing program only after detection of a verification signal. The safety of the installation operation can thereby be increased in that a plausibility check, so to speak, is carried out. The operator of the installation or an externally involved technician can then enable or activate the generated washing program. It is also possible for the generated washing program to be compared with a group of reference programs stored in a database or in that specific frequent error combinations are checked automatically.

In a further exemplary embodiment of the disclosure, the generated washing program is subjected to an automatic plausibility check in order to output an error message in the case of a fault. The error message can include an automatically generated correction suggestion and/or can comprise a statement of technical consequences if the washing installation is operated with a fault. If, e.g., an output for the metering pump is set too high, due to currently detected operating conditions, the increased consumption of metered agents and increased costs may be indicated as output.

The above-described method can be implemented as a computer program. A further way of achieving the object therefore provides a computer program for carrying out all of the method steps of the method described in more detail above when the computer program is executed on a computer, an electronic device or component. It is thus also possible for the computer program to be stored on a medium which can be read by the computer or the electronic device or component.

The method is typically implemented as a platform-independent web-based application. This has the advantage that no further installation requirements by the operator are necessary. The user accesses a server via a typically IP-based interface, the computer program for carrying out the method being installed on this server.

The object is also further achieved by a computer program product which is, or can be, loaded into a memory of a computer or of an electronic device, with a computer program to carry out the method described in more detail above, when the computer program is executed on the computer or the electronic device. The electronic device can be a control computer for the washing installation, which is integrated into the washing installation in a switching and control unit or is connected in as a separate module via an interface.

According to a further aspect, the disclosure relates to a washing program generation unit to generate a group of washing programs for an automatic washing installation for vehicles. The washing program generation unit includes:
  an input interface for reading-in an equipment data set which represents how the washing installation is currently equipped with machine components,
  a processor unit for computing a group of activatable function blocks based on the equipment data set read-in via the input interface,
  a user interface intended to output the group of activatable function blocks computed by the processor unit and intended to detect a selection of the output activatable function blocks,
  wherein the processor unit is also intended to compute or generate a washing program based on the detected selected activatable function blocks. The washing installation is then operated with the generated washing programs.

The washing program generation unit or program configurator typically includes a (graphical) user interface, with which it is controlled and operated.

The washing program generation unit typically includes a slide control to detect a user input of a quality characteristic in dependence upon a time characteristic. The user has the option of adjusting the desired quality of the wash. Since the quality is dependent upon the duration of the washing program, the duration is controlled automatically in dependence upon the specific duration and therefore likewise controlled automatically. Alternatively, the user also has the option of adjusting the time. Then, in dependence upon the specific duration of the washing program, a quality characteristic is automatically set.

In a further aspect, the disclosure relates to a washing installation including such a washing program generation unit. However, the washing program generation unit can also be located externally of the washing installation as a separate module.

BRIEF DESCRIPTION OF THE DRAWINGS

The disclosure will now be described with reference to the drawings wherein.

DESCRIPTION OF EXEMPLARY EMBODIMENTS

The disclosure will be explained hereinafter with the aid of exemplified embodiments and with reference to the figures.

The disclosure is aimed towards the flexible generation of washing programs.

Figure 4:
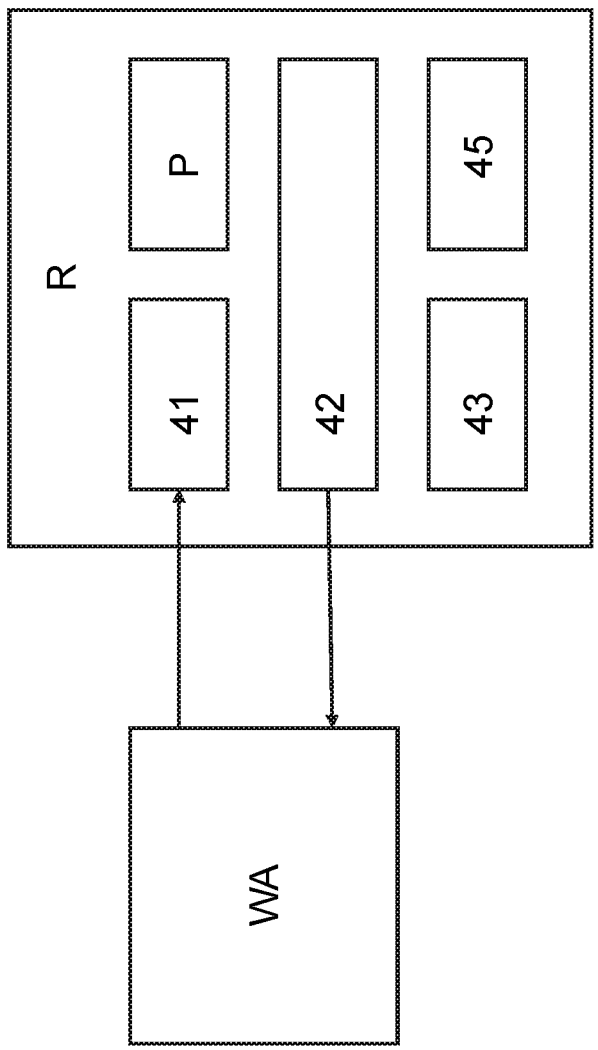
FIG. 4 shows a schematic view of a washing installation with a washing program generation unit according to an exemplary embodiment of the disclosure.

FIG. 4 schematically shows an automatic washing installation WA which is delivered and fully assembled at an operator's premises. In order to put this installation into operation, parameters must be set, and the washing programs must be specified. In accordance with the disclosure, it should be possible for the operator to expand the options for generation of washing programs.

For this purpose, an electronic unit is provided which serves, so to speak, for local generation of washing programs at the operator's premises: the washing program generator. The washing program generator can be integrated into a switching and control center of the washing installation or be connected in as a separate computer via an interface.

The washing program generator includes a washing program generation unit R. The washing program generation unit R serves to generate washing programs which are to be offered and executable at the washing installation WA. The washing program is therefore generated in a rule-based manner. The rules relate to the equipment data set which specifies the machine components with which the washing installation WA is fitted out, and to inputs of a user which set the scope of performance of the installation. A washing program is automatically generated by a program logic from these guide variables.

The washing program generation unit R includes an input interface 41 which serves for the reading-in of the equipment data set which represents how the washing installation is currently equipped with machine components. It further includes a processor unit 42 for computing a group of activatable function blocks based on the equipment data set read-in via the input interface 41 and a user interface 43 which is intended to output the group of activatable function blocks computed by the processor unit 42 and which is intended to detect a selection of the output activatable function blocks. The processor unit 42 is further intended to compute a washing program based on the detected, selected, activatable function blocks in order to operate the washing installation WA. The washing program generation unit R typically includes a further UI (user interface), a control user interface 44 (in particular a graphical user interface, GUI), via which it is controlled and operated on site by the operator or technician in the context of the installation WA. In an exemplary embodiment of the disclosure shown in FIG. 4, the washing program generation unit R can additionally also include an additional processor P which is intended to carry out further computation processes.

In an exemplary embodiment of the disclosure, the washing program generation unit R includes a slide control 45. This can be designed as a mechanical-electronic component (in the sense of a switch). The slide control 45 can also be designed virtually. It is then depicted as an element on a graphical user interface 44 and has buttons for operation. The slide control serves for simultaneous setting of a quality characteristic and of a time characteristic or parameter for the wash. Since the two factors are dependent on each other (proportionally dependent: the higher the quality is to be, the more time the wash requires and vice versa), the slide control 45 is implemented in such a way that upon input or change of one of the two factors, the other factor changes therewith automatically and correspondingly. This also serves to inform the user directly that he can effect only viable inputs.

Figure 1:
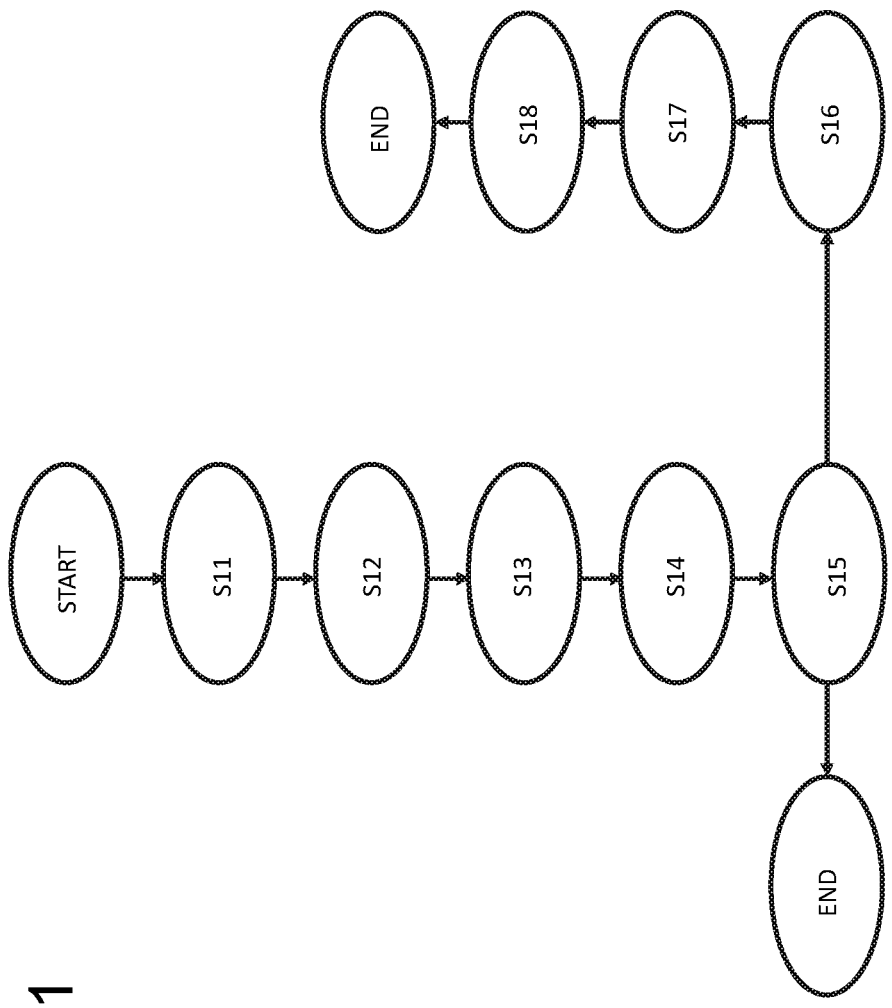
FIG. 1 shows a flow diagram of a method according to an exemplary embodiment of the disclosure.

FIG. 1 shows a typical sequence of a method. After the start, the equipment data set is read-in in step S11. This takes place automatically. It can be read in from a stored file or can be requested via a network interface from the manufacturer of the installation WA. In an exemplary embodiment of the disclosure, the locally read-in equipment data set can be checked in that this is compared with a reference equipment data set to see if there is a match, the reference equipment data set being read-in by the server via the network interface. In step S12, on the basis of the equipment data set, a group of activatable function blocks is automatically computed based on the read-in equipment data set. This has the advantage that in the subsequent step S13, the user is shown and offered for selection as activatable only the function blocks which he can also execute on the current installation WA as currently configured or equipped. In step S14, the user's selection is then detected. The user can thus select at this point the scope of performance he wishes to effect at the installation WA. With this information, a washing program can then be generated automatically, in which the control variables are taken into consideration (such as how the machine/installation WA is currently equipped and possibly further configurations of machine components), which type of machine component is installed (length of hoses, pump output volumes, etc.) and the user's inputs for selection of desired function blocks and for specification of the scope of performance to be achieved on the installation WA to be operated. In step S15, the washing program generator can therefore be operated in a rule-based manner using the above-mentioned and further control variables so that a controlled and automatic generation of the washing program can be carried out which is specifically adapted to the respective requirements and technical circumstances. The method can terminate thereafter or be carried out iteratively in order e.g. to modify inputs that have been made.

In an exemplary embodiment of the disclosure, in step S16 a verification signal can be detected. This serves to increase safety. In this case the user and/or manufacturer of the installation WA (who can be connected-in via a network interface (Internet)) has the option, before commissioning of the installation WA, to check, by the generated and automatically configured program, whether all adjustments are correct and whether the washing program is inherently correct. Pre-setting may be such that the washing installation WA can be brought into operation only when the verification signal has been detected.

In step S17, the generated washing program can typically be subjected to an automatic plausibility check. In the case of a fault, an error message can be output in step S18.

The method steps of the method are typically carried out in the stated order. However, this does not have to take place in immediate succession. Thus, it is possible, e.g., for the generation of the washing program to be carried out only after a certain time period has elapsed.

All the method steps of the method can be implemented by electronic devices (circuits, e.g., on a printed circuit board, PCB) which are suitable for carrying out the respective method step. Conversely, all functions which are carried out by features relating to objects can be a method step of a method. Thus, e.g., the method step of "reading-in an equipment data set" can be implemented by an input interface which has said corresponding functionality for reading-in purposes.

Figure 2:
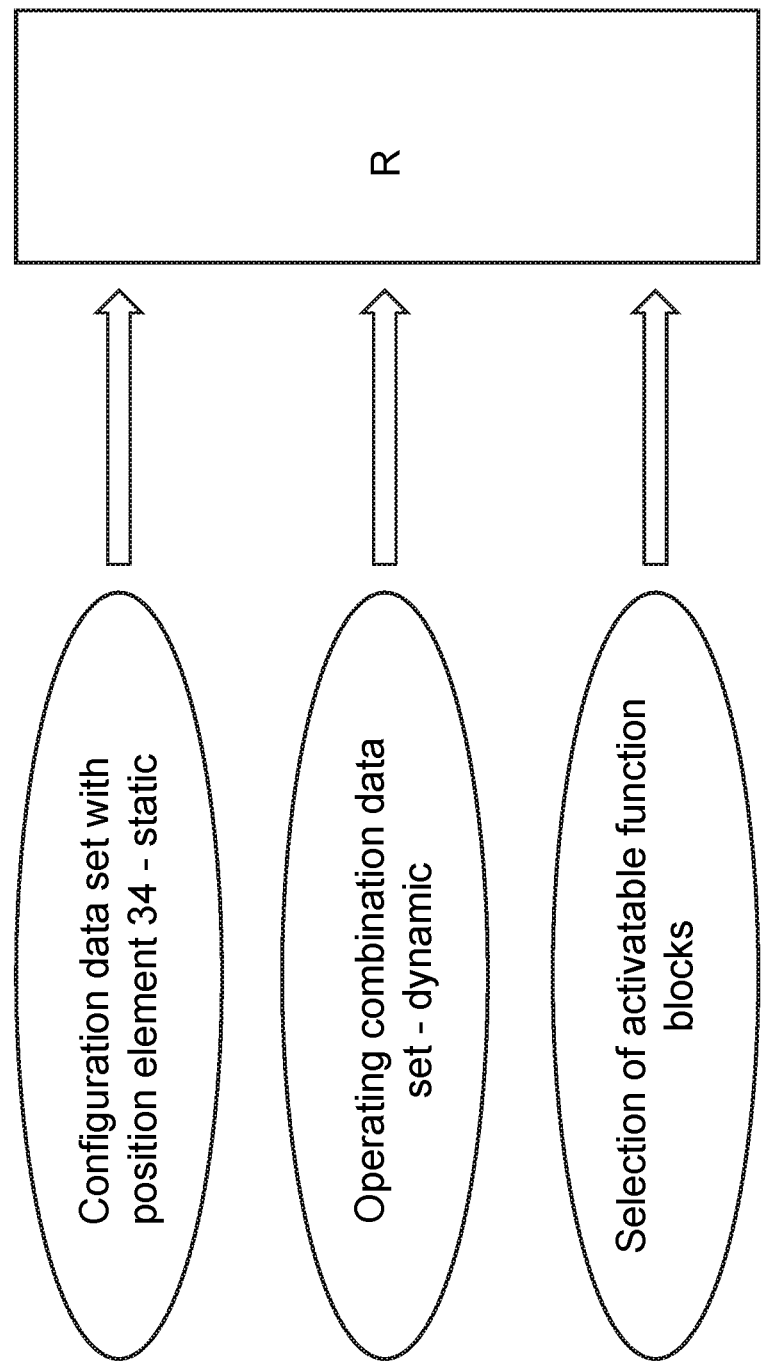
FIG. 2 shows a schematic overview of control variables for generating the washing program.

FIG. 2 illustrates the variables which serve for automatic washing program generation. This concerns the equipment data set with a dynamic and a static portion. The dynamic portion (operating constellation data set) typically includes data relating to the current operating conditions and data relating to the selection of activatable function blocks for specification of the desired scope of performance. The variables mentioned are read-in in the usual manner by different units via different interfaces. The washing program generation unit R then generates the washing program.

The data set which is used according to an exemplary embodiment of the disclosure for computation of the washing program includes the equipment data set 31 with a (dynamic) operating constellation data set 32 which characterizes the current operating conditions (e.g., water supply pressure, etc.), the (static) configuration data set, and a selection data set for definition of the selection of function blocks (scope of performance) and—optionally—a position element 34 which indicates the position at which a specific machine component is installed in the washing installation WA. Thus, e.g., it regularly makes a difference where the metering pump(s) are installed in the washing installation WA. In dependence upon the position thereof and therefore the distance thereof from the operating assemblies to be supplied thereby (e.g., the brushes) different hose lengths result according to circumstances. In order to avoid down times, the metering pumps can now be actuated in a modified manner in order to be able to adapt the pressure build-up times to the water drainage. This also applies to the construction height of the washing installation WA (e.g., when the installation is designed not for passenger cars but for commercial vehicles and therefore has a taller construction height). Different hose lengths can also result from this and render adapted operating assembly or machine component adjustments necessary.

Figure 3:
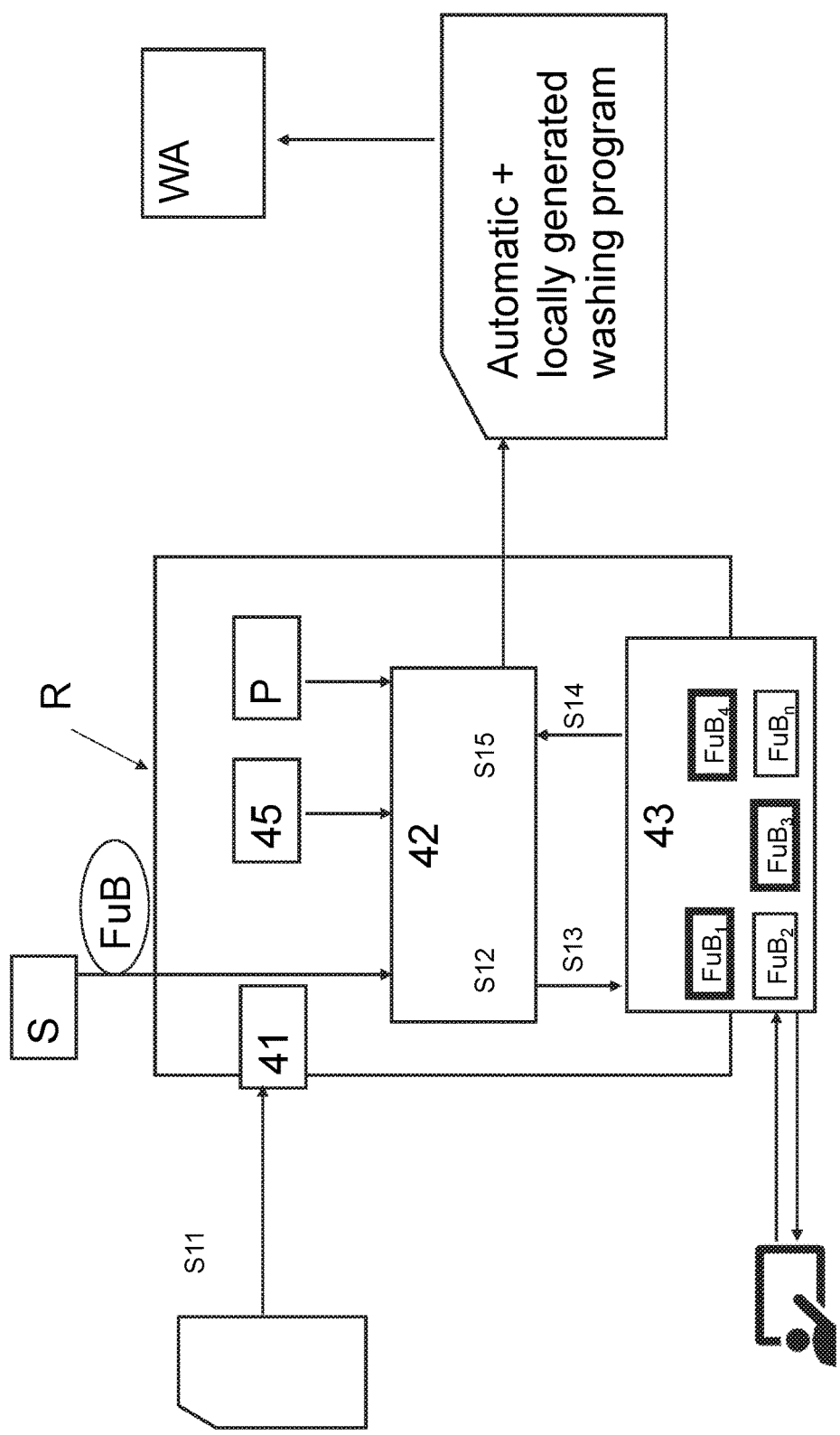
FIG. 3 shows a structural overview of a washing program generation unit according to an exemplary embodiment of the disclosure.

FIG. 3 shows a schematic-structural view of the washing program generation unit R during operation. Firstly, in step S11, the equipment data set and possibly further information relevant to washing program generation are read-in via the interface 41 from, e.g., a memory card. As shown in FIG. 3, top left, this can take place by accessing an SD memory card. A group of generally available function blocks FuB can be stored in a memory of the washing program generation unit R (not shown in FIG. 3) or be read-in via an interface to a server S as shown at the top of FIG. 3. In step S12, the processor unit 42 is configured to specify which of the group of generally available function blocks FuB are activatable function blocks which can be activated on the basis of how the washing installation WA is fitted out (equipment data set, configuration data set). In step S13, these are output on the graphical user interface 43. The operator is then given the option of selecting specified function blocks from the displayed activatable function blocks in order to specify the scope of performance of the washing program to be generated. In the figure, these function blocks selected by the user are illustrated outlined in bold, thus in this example, function blocks FuB1, FuB3 and FuB4. In step S14, this selection is forwarded to the processor unit 42 with a selection data set. With these data, the processor unit 42 can generate a washing program automatically and locally on the installation in step S1, said program being forwarded to the washing installation WA for execution.

Figure 5:
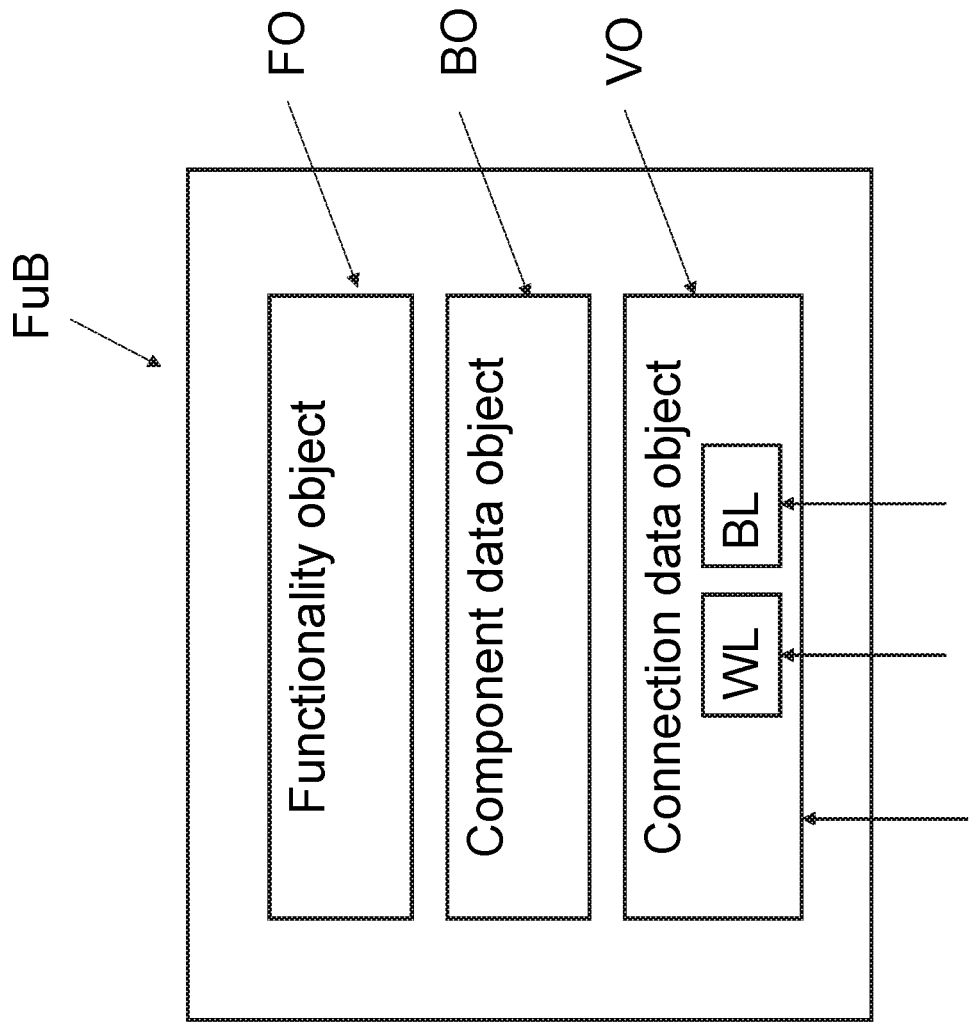
FIG. 5 shows a schematic view of a function block according to an exemplary embodiment of the disclosure.

FIG. 5 schematically shows the construction of a function block FuB. This is stored and processed as a digital object. It includes a functionality object FO which represents the respective functionality of the function block FuB. Furthermore, it includes a component data object BO which specifies the machine components required for its functionality, and a connection object VO in which permitted connection information is stored. This can include, e.g., a rule data set which accesses a blacklist BL with prohibited connections or prohibited connection rules, and a white list with permitted connections or permitted connection rules. The blacklist BL and the white list WL can be retrieved via a server connection, each in updated form. Cumulatively or alternatively, the connections rules can be stored centrally in a rule base and likewise be accessible via a network interface. This has the advantage that the rules or the list with permitted and non-permitted function block connections can also be changed centrally without a change to the installation being necessary. This is shown in FIG. 5 by the three arrows at the bottom.

Finally, it is noted that the description of the disclosure and the exemplary embodiments are fundamentally to be understood to be non-limiting with respect to a specific physical implementation of the disclosure. All features explained and illustrated in conjunction with exemplary embodiments of the disclosure can be provided in a different combination in the subject matter in accordance with the disclosure in order to achieve the advantageous effects thereof at the same time. Thus, the subject matter of the disclosure can be applied to different types of automatic washing installations, such as gantry washing installations, etc. Furthermore, it is, e.g., also within the scope of solution described herein to provide—alternatively or cumulatively with respect to the graphical user interface—other operating or control elements than an interface for inputting the selection of function blocks. It is particularly obvious to a person skilled in the art that the solution described herein can be applied not only for specific configurations of washing installations but also for washing installations which are fitted out with different machine components or with machine components which are configured differently (e.g. different performance spectrum of a pump, etc.).

Furthermore, the components of the washing program generator and/or of the washing program generation unit R can be embodied in a manner distributed to a plurality of physical products. They are then in data exchange via corresponding interfaces. This increases the modularity of the system.

It is understood that the foregoing description is that of the exemplary embodiments of the disclosure and that various changes and modifications may be made thereto without departing from the spirit and scope of the disclosure as defined in the appended claims.

What is claimed is:

1. A method for generating a washing program for operation of an automatic washing installation for vehicles, the method comprising:
  reading-in an equipment data set which represents machine components installed in the automatic washing installation;
  providing for selection a group of activatable function blocks based on the read-in equipment data set, wherein each function block of the group of activatable function blocks is a digital object which allocates machine components to a functionality carried out by the automatic washing installation;
  detecting a selection of at least one function block of the group of activatable function blocks; and
  automatically generating the washing program with a computed sequence of the at least one function block selected from the group of activatable function blocks for operation of the washing installation,
  wherein the equipment data set comprises a configuration data set which represents a configuration of the machine components installed in the washing installation and an operating constellation data set which represents operating conditions for the machine components,
  wherein the configuration data set remains unchanged subsequent to commissioning the washing installation,
  wherein the operating data set dynamically changes during operation depending on the operating conditions,
  wherein each function block includes a connection data object storing connection information including a whitelist and a blacklist of other function blocks,
  wherein the whitelist defines with which of the other function blocks the at least one function block can connect,
  wherein the blacklist defines with which of the other function blocks the at least one function block cannot connect,
  wherein the at least one function block further stores a priority value for ordering execution of the washing program,
  wherein a combination of permitted function blocks in a run is determined by the whitelist and the blacklist and stored as a list of permitted washing processes, and
  wherein the washing program is automatically generated by sorting the list of permitted washing processes based on the priority value stored in the at least one function block.

2. The method as claimed in claim 1, wherein the equipment data set is read-in via an interface or stored in a memory of the washing installation.

3. The method as claimed in claim 1, wherein the equipment data set comprises a position element which characterizes a position of each machine component in the washing installation.

4. The method as claimed in claim 1, wherein the operating conditions include a water pressure and changes on the machine components.

* * * * *